(12) United States Patent
Agarwal et al.

(10) Patent No.: US 11,336,724 B2
(45) Date of Patent: May 17, 2022

(54) DATA TRANSFORMATION AND ANALYTICS AT EDGE SERVER

(71) Applicant: Microsoft Technology Licensing, LLC, Redmond, WA (US)

(72) Inventors: Sourabh K. Agarwal, Redmond, WA (US); Jasraj Dange, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/394,599

(22) Filed: Apr. 25, 2019

(65) Prior Publication Data

US 2020/0344297 A1 Oct. 29, 2020

(51) Int. Cl.
*H04L 67/1097* (2022.01)

(52) U.S. Cl.
CPC ............... *H04L 67/1097* (2013.01)

(58) Field of Classification Search
CPC ........ G06F 13/00; G06F 16/258; G06F 17/27; G06F 17/30; G06F 17/272; G06F 17/2247; G06F 17/2705; G06F 17/3089; G06F 17/30569; G06F 17/30864; G06F 40/205; G06N 5/02; G06N 5/03; G06N 5/04; G06N 5/022; G06N 99/005; G06Q 30/02; H04L 12/24; H04L 29/06; H04L 29/08; H04L 29/0809; H04L 29/08072; H04L 29/08117; H04L 41/14; H04L 41/16; H04L 41/0677; H04L 41/0668; H04L 41/5019; H04L 63/16; H04L 67/00; H04L 67/12
USPC ............... 706/46; 709/219; 707/755
See application file for complete search history.

(56) References Cited

U.S. PATENT DOCUMENTS

| | | | |
|---|---|---|---|
| 2007/0044095 A1* | 2/2007 | Banerjee | H04W 12/0609 717/176 |
| 2016/0306689 A1* | 10/2016 | Jain | G06F 11/079 |
| 2017/0177546 A1* | 6/2017 | Heinz | G06N 20/00 |
| 2017/0310546 A1* | 10/2017 | Nair | H04L 41/0654 |
| 2018/0032908 A1* | 2/2018 | Nagaraju | G06F 11/30 |
| 2018/0189228 A1* | 7/2018 | Park | H04L 67/20 |
| 2018/0219960 A1* | 8/2018 | Knecht | G06F 21/645 |
| 2018/0246944 A1* | 8/2018 | Yelisetti | G06F 16/258 |
| 2018/0285767 A1* | 10/2018 | Chew | H04L 67/12 |
| 2018/0300124 A1 | 10/2018 | Malladi et al. | |
| 2018/0373419 A1 | 12/2018 | Chen et al. | |

(Continued)

FOREIGN PATENT DOCUMENTS

EP 3462338 A1 4/2019

OTHER PUBLICATIONS

Mukunthu, "Announcing automated ML capability in Azure Machine Learning", Sep. 24, 2018, https://azure.microsoft.com/en-us/blog/announcing-automated-ml-capability-in-azure-machine-learning/ / (Year: 2018).*

(Continued)

*Primary Examiner* — Douglas B Blair
(74) *Attorney, Agent, or Firm* — Schwegman Lundberg & Woessner, P.A.

(57) ABSTRACT

A computer implemented method includes receiving data from multiple devices at an edge server, transforming the data received from the multiple devices, storing the transformed data in an edge server database, performing analytics on the transformed data in the database, and selectively uploading data to a remote server via a network.

16 Claims, 3 Drawing Sheets

(56) References Cited

U.S. PATENT DOCUMENTS

| | | | |
|---|---|---|---|
| 2019/0019090 A1* | 1/2019 | Chacko | G06Q 10/06 |
| 2019/0042618 A1* | 2/2019 | Potulska | G06F 16/2365 |
| 2019/0114293 A1* | 4/2019 | Li | G06Q 30/0201 |
| 2019/0269344 A1* | 9/2019 | Shah | A61B 5/7435 |
| 2019/0356539 A1* | 11/2019 | Soon-Shiong | H04Q 9/02 |
| 2019/0377946 A1* | 12/2019 | Genty | G06K 9/00664 |
| 2019/0392328 A1* | 12/2019 | Gil Bulacio | H04L 41/0677 |
| 2020/0015121 A1* | 1/2020 | Misra | H04W 28/06 |
| 2020/0327371 A1* | 10/2020 | Sharma | G06K 9/6257 |
| 2021/0312283 A1* | 10/2021 | Potgieter | G06N 3/08 |

OTHER PUBLICATIONS

"International Search Report and Written Opinion Issued in PCT Application No. PCT/US20/025629", dated Jul. 9, 2020, 12 Pages.

\* cited by examiner

US 11,336,724 B2

DATA TRANSFORMATION AND ANALYTICS AT EDGE SERVER

BACKGROUND

Internet of Things (IoT) devices are predicted to generate enormous amounts of data. The number of IoT devices in use is expected to exceed hundreds of millions of devices. Such devices may be battery powered. Limitations in the amount energy provided by batteries means that many if not most of the IoT devices will only have short range wireless communication abilities.

Cloud computing resources will likely be used to process the data generated by the massive number of IoT devices. Networks used to communicate the data to the cloud computing resources may become burdened by the massive amount of data, and may not be able to receive and process the data in a timely manner.

SUMMARY

A computer implemented method includes receiving data from multiple devices at an edge server, transforming the data received from the multiple devices, storing the transformed data in an edge server database, performing analytics on the transformed data in the database, and selectively uploading data to a remote server via a network.

DETAILED DESCRIPTION

Figure 1:
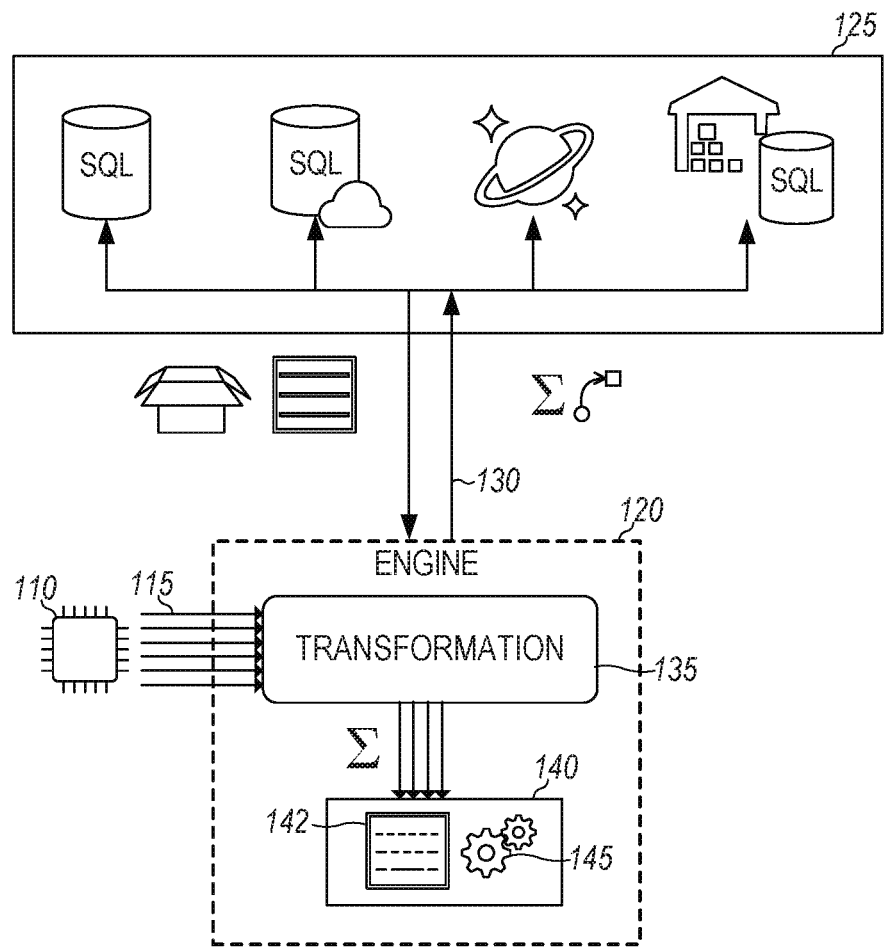
FIG. 1 is a block diagram of a system for processing device data at an edge of a network according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

IoT and Edge computing is characterized by the enormous amount of data which gets generated through the millions and millions of IoT sensors being deployed. Depending on connectivity and bandwidth constraints, this enormous amount of cannot be all moved to the cloud for storage and analysis, as such, there is a need to be able to store, process, aggregate, filter and predict/analyze these datasets before moving the aggregated/filtered cloud.

Given the volume of data and the logistical constraints it becomes extremely important for organization to deploy a data solution which provides native capabilities to store, process, analyze, filter and then move this data between the edge and a public/private cloud. None of the existing players in the edge data space provide this built-in capability.

FIG. 1 is a block diagram of a system 100 for such a data solution. System 100 includes many data producing devices, such as IoT sensors 110 that generate a large amount of data. The sensors 110 may also include wireless devices that operate as sensors, or even as actuators for responding to control signals and performing actions. In various embodiments, the number of sensors 110 may vary from one to hundreds, thousands, or more, creating a large amount of data. The sensors may be battery powered and include transceivers for transmitting the data wirelessly. Some sensors may sense and transmit data at high rates, such as many times per second, while other sensors may transmit once every few seconds or minutes, or longer to conserve battery energy.

The data is transmitted as shown at 115 to an edge device, such as edge server 120 that includes programming to implement database functions such as SQL, wherein SQL stands for structure query language. Edge server 120 is a computing device running software with functionality that can receive and process data with a very low latency delay. Examples of an edge server 120 include a server within an organization, such as in a data center that can quickly receive the data with very little time or latency between sending of the data and the edge server receiving the data. Edge server 120 is configured with software to ingest large volume of data from sensors, such as hundreds or thousands of sensors emitting data every second or other time period, as well as from other devices running.

In some embodiments, the edge server 120 may be in communication with a remote server 125 coupled via a network 130. The remote server may include cloud resources, such as SQL servers, data lake storage, and other services. Network 130 may be a public network, such the Internet, or a private network. Network 130 may include many nodes that include routers, switches, hubs, and other equipment designed to receive and route data, such as data packets, and possibly perform functions on the data during transit. As such, there can be significant delays in the network before the data even reaches a destination. The edge server 120 is a server that is between the sensors 110 and the network 130. Edge server 120 may be coupled to receive data directly from the sensors 110, or from one or more other devices that receive the data from the sensors 110. The Edge server 120 may be coupled near the edge of the network 130, and may also be referred to as a gateway, so that data from the sensors 110 reaches the edge server 120 quickly, and without latency associated with sending the data to other devices via the network.

Edge server 120 includes windowing and transformation component 135 in one embodiment that performs aggregation of the data or other transformation of the data. The windowing and transformation component 135 may operate on data as it is received or may receive a series of data during one or more time based windows associated with each of the sensors 110. Windowing and transformation component 135 may perform functions on data received from the sensors during a time window associated with the sensor. Such functions may include buffering the received data during the time window and transforming the data. Transforming the data may include performing windowing aggregation and statistical analysis, such as averages, means, outlier identification, derivatives, standard deviations, and other types of transformation of the data which may vary depending on the environment/application in which the sensors are sensing. Further transformations may include aggregation of the data, converting data between rows and columns, grouping by aggregation, joining data from different sensors, and other functions performed on an ad-hoc basis. Ad-hoc in this context refers to the performance on data received and buffered during corresponding time windows for the sensors, and not storing and retrieving the data outside of such time windows.

The transformed data is provided to a database engine 140, such as an SQL (structure query language) database engine, wherein the transformed data may be stored, indexed, and made available in a relational database 142. The data in database 142 may be accessed for the performance of other functions 145 that execute on engine 140. Functions 145 may include various analytics on the data stored in database 142, such as many different relational database functions, binary classification, linear regression. SQL execution, aggregation, relational queries, graph based queries, or other types of analytics/functions that may be performed on data stored in a relational database format.

One such function includes one or more machine learning models. The machine learning models in one embodiment may be trained via the remote server 125 based on data provided from the edge server 120. The data provided from the edge server 120 may include the sensor data 115 as well as analytics performed on the raw sensor data 115 that may also be stored in database 142. Several different applications, referred to as scenarios, are described below for which models may be generated to make predictions associated with such applications. Since model training can be a resource intensive endeavor, moving model training to the remote server ensures that local resources of the edge server are not constrained and can be applied to the collection and local analysis as the data is collected. In one embodiment, Azure ML (machine learning) models are provided via remote server 125. Various functions written in different programming languages may also be performed, including programming written in Python, Spark, Java and other languages.

Remote server 125, in addition to receiving data from the edge server 120 may also provide device synchronization by providing data and deployment software packages to the edge server 120. Business rules or security policies may be received from the remote server for implementation on the edge server 120.

Edge server 120 offloads transformed and aggregated data (data from the sensors) to cloud/enterprise data centers, remote server 125. Note that the edge server 120 is described in terms of software that may execute on processing resources. Additionally, edge server 120 provides customers the ability to configure custom retention policies for data on Edge, before data is offloaded to cloud or private data centers.

Given the enormous amount of data that is generated on the edge of networks, edge server 120 performs transformations of the generated data, such as aggregation on the stream of data 115 flowing into edge server 120. A majority of the IoT sensors generate data at a fixed time interval, with each data point having a time attribute attached to it. As such the edge server 120 via windowing and transformation component 135 may perform windowing and time series specific processing on the Edge.

Additionally, edge server 120 has the ability to perform In-database ML using either native T-SQL functionality or using models 145 or algorithms written in R, Python, Spark or Java. Customers will be able to train their models in the cloud, remote server 125, using the cloud based scalable resources and analytics, and push the trained models to edge server 120 for scoring via model 145.

Edge server 120, through a native integration of analytics functions such as Azure Stream Analytics provides the above capabilities without the need for an external solution to sync data between edge and the public/private clouds. Edge server 120 is also scalable, as more processing resources may be added to execute the functions performed as increasing amounts of data from an increasing number of sensors is received.

Figure 2:
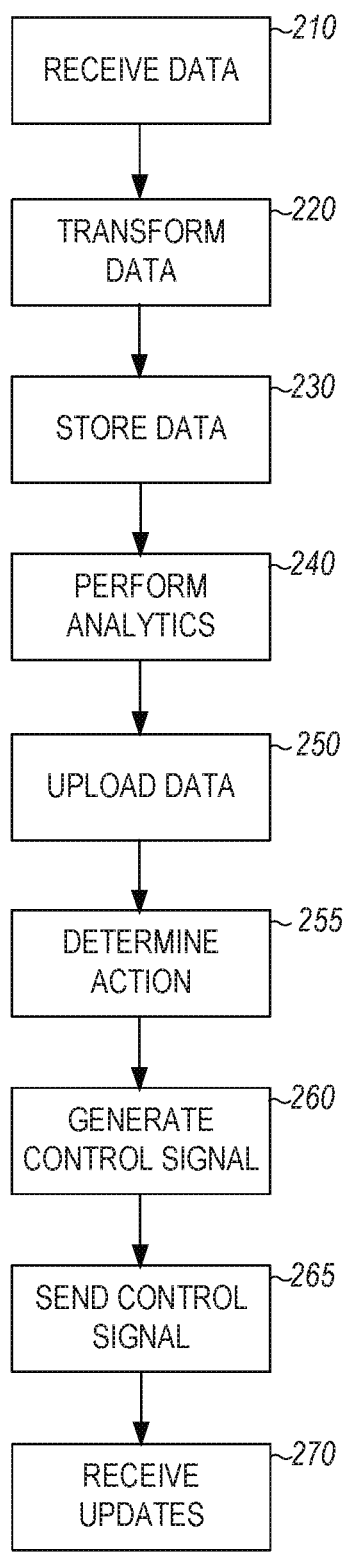
FIG. 2 is a flowchart illustrating a computer implemented method of processing data from devices coupled to edge server according to an example embodiment.

FIG. 2 is a flowchart illustrating a computer implemented method 200 of processing data from devices 110 coupled to edge server 120. Method 200 begins by multiple devices, such as IoT devices, generating data and sending it such that it is received at operation 210 by an edge server. The data may be received from each of the multiple devices periodically. The period between values received may be the same or different for different devices, such as sensors. The same type of sensors, such as temperature sensors may have the same period or frequency of sensing and transmission. Each value of the data representative of a sensed parameter may be timestamped. The edge server may receive the data wirelessly from the multiple devices without the data being transferred via a public network to the edge server.

The received data from each of the multiple devices is transformed at operation 220 by the edge server. The transformation may include aggregation, or otherwise combining the data via one or more statistical processes or other analytics. In some embodiments, data received during a specified time window, such as a device specific window, may be transformed. The time window may be the same length for multiple or all devices or may vary in length for each device or type of device. Statistical or mathematical computations may be one of the transformations of the data received during each device specific window.

At operation 230, the transformed data is stored by the edge server into an edge server database. The data so stored may include the transformed data.

At operation 240, method 200 may further include executing various functions described above with respect to the analytics functions 145. The results may also be stored in databased 142.

At operation 255, an action may be determined based on the results of the functions that were performed. The action may be a function of the particular scenario in which system 100 is implemented. Example scenarios are described below, and may include generating alerts and/or controlling various functions based on parameters sensed by the sensors 110. At operation 260, a control signal may be generated based on the functions, and the control signal may be sent at 265 to one or more of the wireless devices for causing an action associated with the multiple wireless devices to be performed. At operation 270, data and or program package updates are received at the edge server from the remote server.

Figure 3:
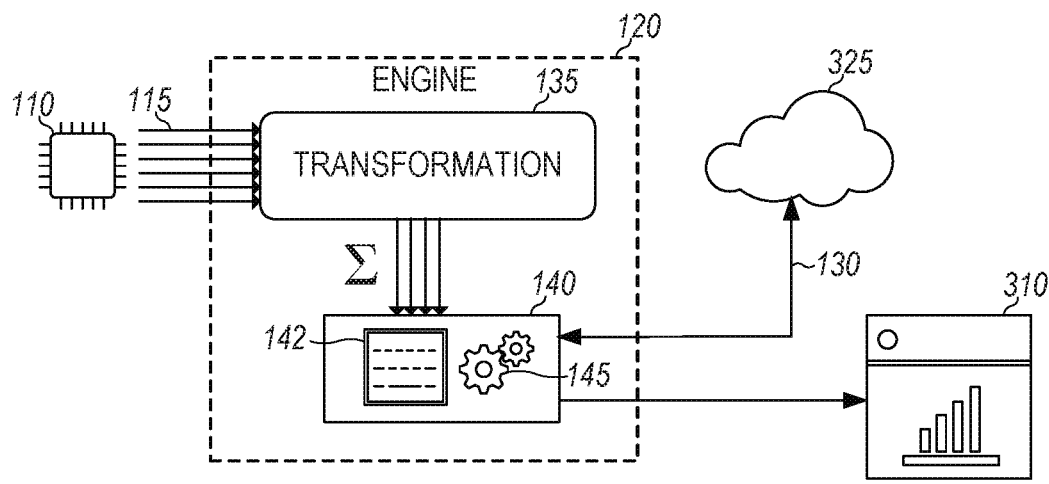
FIG. 3 is a block diagram of a system that collects streaming data for an application corresponding to a selected scenario according to an example embodiment.

FIG. 3 is a block diagram of a system 300 that collects streaming data for an application 310 corresponding to a selected scenario. Reference numbers for like components in FIGS. 1 and 3 are the same. Real time sensor data 115 is streamed from multiple sensors 110 to the edge server 120. Edge server 120 includes windowing and transformation component 135 to transform the streamed data, and also includes engine 140 and functions 145. Network 130 provides data from database 142 to cloud resources 325, which may be the same as or include remote server 125.

Application 310 may include a dashboard or other user interface for one or more scenarios. The application 310 may trigger uploading of data from the edge server 120 to cloud resources 325 based on user defined logic via the user interface, or such uploading may be performed periodically. The uploaded data may be selected from the databased 142 or from output provided by functions 145, or a combination thereof in different embodiments. By performing functions 145 on the data prior to uploading, local control actions may be taken in a timely manner, and the amount of uploaded data may be significantly less than that amount of data received from the sensors and other devices, resulting in less network bandwidth being consumed.

The following are example use case scenarios for native scoring on edge server 120 and application 310. There are many more scenarios that could utilize the system 100 or system 300 that would be straight forward to implement. Each scenario would use a model or other analytics as part of functions 145 trained by historical data associated with the scenario.

Agricultural Farms—

Agricultural farms are characterized by the presence of large number of sensors (Temp, humidity, moisture etc.), each generating huge amount of data every few seconds. All these data generated from these sensors are used to predict, via a model or other analytics provided by functions 145 that is specific to this scenario, several factors like fertilizers requirements, crop dusting schedules, irrigation requirements. Given the large volume of data generated from these sensors and the geographical locations of these farms, it would be counter-productive to upload these data sets to Azure or other public/private clouds. This dataset is generally aggregated based on a time window (for example, 1-minute avg, 5-minute avg, 15-minute avg. etc.) before being uploaded to the cloud. In this scenario, edge server 120 may be located at the farm, such as in WiFi router or local area network device.

Connected Vehicles—

Connected vehicles are another example of a scenario where an enormous volume of data is generated on the edge. The enormous volume of data needs to be aggregated, processed and then uploaded to the cloud storage for further analytics by scalable computing resources. Additionally, in the case of connected vehicles, scoring of the data on the edge via ML models running on edge server 120 is of importance to provide real time feedback to facilitate scenarios like dynamic route planning, vehicle wear and tear management, temperature control for perishable goods, etc. In this scenario, edge server 120 may be located in each vehicle, or possibly in a cellular tower in direct communication with the car. However, hand offs between towers may increase complexity, making it more likely that the edge server 120 is located with the vehicle.

Oil and Gas Rigs—

Oil & Gas rigs sitting in the middle of an ocean or a remote geographical location are characterized by the need to provide low latency real time analytics of the data on the Edge. These rigs are often time sensitive in nature and in majority of the cases cannot withstand the latency of pushing data to cloud and performing analytics on the cloud. Data (mostly last few minutes or hours of data) need to be analyzed quickly to drive actions/outcomes on the Rig. For example, temperature, pressure and volume data needs to be analyzed and correlated in real time to control pressure on the valves or overall cooling on the rig. By moving analytics and ML models to the edge server 120, the data can be analyzed and correlated in real time for such control. The edge server 120 in this scenario would likely be in processing resources local to the rig.

Security and Surveillance—

Security and Surveillance industry is another example where real time analytics of the data on the edge is of utmost importance to ensure the system can identify fraudulent attempts to by-pass security.

Figure 4:
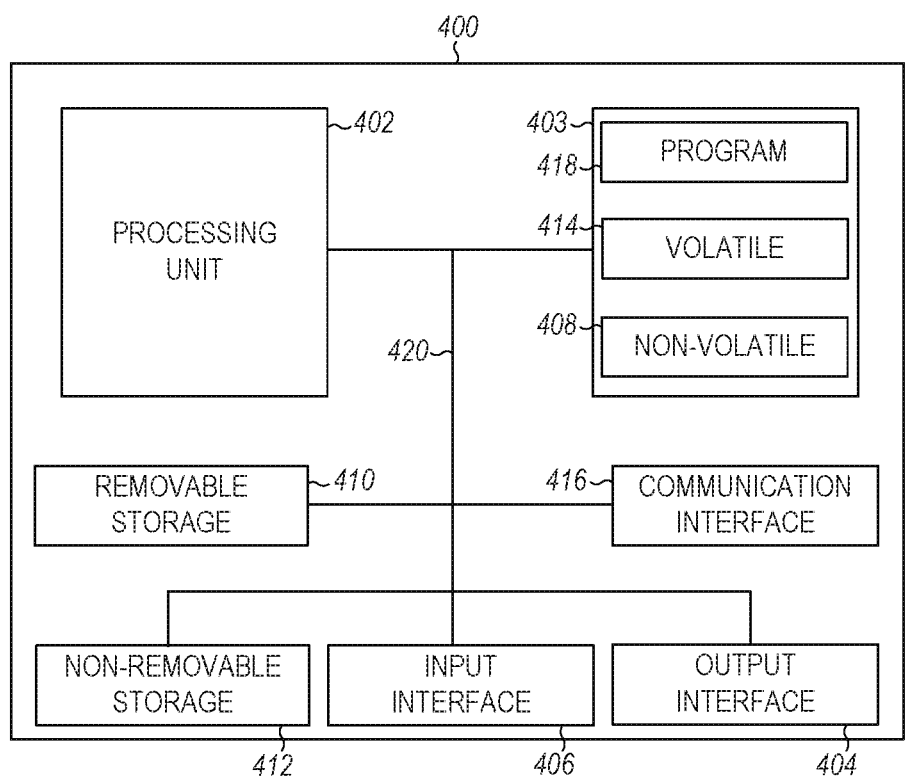
FIG. 4 is a block schematic diagram of a computer system to implement one or more example embodiments.

FIG. 4 is a block schematic diagram of a computer system 400 to implement edge devices, servers, IoT device and other devices to perform methods and algorithms according to example embodiments. All components need not be used in various embodiments.

One example computing device in the form of a computer 400 may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, smart storage device (SSD), or other computing device including the same or similar elements as illustrated and described with regard to FIG. 4. Devices, such as smartphones, tablets, and smartwatches, are generally collectively referred to as mobile devices or user equipment.

Although the various data storage elements are illustrated as part of the computer 400, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM). Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input interface 406, output interface 404, and a communication interface 416. Output interface 404 may include a display device, such as a touchscreen, that also may serve as an input device. The input interface 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software to implement one or more of the methods described herein, such as sensing data, transmitting data, performing analytics, executing machine learning models, storing data, and other functions described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 418 along with the workspace manager 422 may be used to cause processing unit 402 to perform one or more methods or algorithms described herein.

EXAMPLES

1. A computer implemented method includes receiving data from multiple devices at an edge server, transforming the data received from the multiple devices, storing the transformed data in an edge server database, performing analytics on the transformed data in the database, and selectively uploading data to a remote server via a network.

2. The method of example 1 wherein the data received from each of the multiple devices is received periodically from the multiple wireless devices.

3. The method of any of examples 1-2 wherein transforming the data received from each of the multiple devices includes buffering and transforming data received during a specified window of time.

4. The method of example 3 wherein the specified window of time is device dependent.

5. The method of any of examples 1-4 and further comprising executing a function on the stored data in the edge server database.

6. The method of example 5 wherein the function comprises executing a machine learning model to perform scoring, wherein the machine learning model is provided from the remote server.

7. The method of example 6 and further including determining an action based on an output of the executed function, generating a control signal based on the determined action, and transmitting the control signal to one or more of the devices for causing the action to be performed.

8. The method of any of examples 5-7 wherein the function comprises one or more of relational database functions, binary classification, linear regression, query execution, and aggregation to generate an output.

9. The method of example 8 and further comprising storing the output in the edge server database.

10. The method of any of examples 1-9 and further comprising receiving updates at the edge server from the remote server.

11. The method of any of examples 1-10 wherein the network comprises a public network or a private network and wherein the remote server comprises cloud resources.

12. The method of any of examples 1-11 wherein the multiple devices comprise Internet of Things (IoT) wireless sensors.

13. The method of any of examples 1-12 wherein selectively uploading data to the remote server via the network comprises uploading data in response to an on-demand request from an application.

14. The method of any of examples 1-13 wherein selectively uploading data to the remote server via the network comprises uploading data periodically.

15. A machine-readable storage device has instructions for execution by a processor of a machine to cause the processor to perform operations to perform a method of managing communication accounts. The operations include receiving data from multiple devices at an edge server, transforming the data received from the multiple devices, storing the transformed data in an edge server database, performing analytics on the transformed data in the database, and selectively uploading data to a remote server via a network.

16. The device of example 15 wherein the data received from each of the multiple devices is received periodically from the multiple wireless devices and wherein transforming the data received from each of the multiple wireless devices includes buffering and transforming data received during a specified window of time.

17. The device of any of examples 15-16 wherein the operations further include executing a function on the stored data in the edge server database, determining an action based on an output of the executed function, generating a control signal based on the determined action, and transmitting the control signal to one or more of the devices for causing the action to be performed.

18. The device of example 17 wherein the function comprises one or more of relational database functions, binary classification, linear regression, query execution, and aggregation to generate an output.

19. A device includes a processor and a memory device coupled to the processor and having a program stored thereon for execution by the processor to perform operations. The operations include receiving data from multiple devices at an edge server, transforming the data received from the multiple devices, storing the transformed data in an edge server database, performing analytics on the transformed data in the database, and selectively uploading data to a remote server via a network.

20. The device of example 19 wherein the data received from each of the wireless devices is received periodically from the multiple wireless devices and wherein transforming the data received from each of the multiple wireless devices includes buffering and transforming data received during a specified window of time. The operations further include executing a function on the stored data in the edge server database, determining an action based on an output of the executed function, generating a control signal based on the determined action, and transmitting the control signal to one or more of the wireless devices for causing the action to be performed.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving data from multiple devices at an edge server via local wireless connections to the multiple devices;
transforming the data received from the multiple devices;
storing the transformed data in an edge server relational database having a database engine;
uploading the transformed data to a remote server;
receiving from the remote server, a trained machine learning model trained on the transformed data;
receiving new data from the multiple devices;
executing, on the edge server, the trained machine learning model on the new data to perform scoring;
determining an action based on the scoring performed by the trained machine learning model;
generating a control signal, to control one or more devices, based on the determined action; and
transmitting the control signal to one or more of the devices for causing the action to be performed by the one or more devices based on the control signal.

2. The method of claim 1 wherein the data received from each of the multiple devices is received periodically from the multiple wireless devices.

3. The method of claim 1 wherein transforming the data received from each of the multiple devices includes buffering and transforming data received during a specified window of time.

4. The method of claim 3 wherein the specified window of time is device dependent.

5. The method of claim 1 and further comprising performing analytics on the transformed data in the database via the database engine, wherein performing analytics on the transformed data comprises performing one or more of relational database functions, binary classification, linear regression, query execution, and aggregation to generate an output.

6. The method of claim 5 and further comprising storing the output in the edge server database.

7. The method of claim 1 and further comprising receiving updates at the edge server from the remote server.

8. The method of claim 1 wherein the network comprises a public network or a private network and wherein the remote server comprises cloud resources.

9. The method of claim 1 wherein the multiple devices comprise Internet of Things (IoT) wireless sensors.

10. The method of claim 1 wherein selectively uploading data to the remote server via the network comprises uploading data in response to an on-demand request from an application.

11. The method of claim 1 wherein selectively uploading data to the remote server via the network comprises uploading data periodically.

12. A non-transitory computer-readable medium having instructions for execution by a processor of a machine to cause the processor to perform operations to perform a method, the operations comprising:
receiving data from multiple devices at an edge server via local wireless connections to the multiple devices;
transforming the data received from the multiple devices;
storing the transformed data in an edge server relational database having a database engine;
uploading the transformed data to a remote server;
receiving from the remote server, a trained machine learning model trained on the transformed data;
receiving new data from the multiple devices;
executing, on the edge server, the trained machine learning model on the new data to perform scoring;
determining an action based on the scoring performed by the trained machine learning model;
generating a control signal, to control one or more devices, based on the determined action; and
transmitting the control signal to one or more of the devices for causing the action to be performed by the one or more devices based on the control signal.

13. The device of claim 12 wherein the data received from each of the multiple devices is received periodically from the multiple wireless devices and wherein transforming the data received from each of the multiple wireless devices includes buffering and transforming data received during a specified window of time.

14. The device of claim 12 and further comprising performing analytics on the transformed data in the database via the database engine, wherein the performing analytics on the transformed data comprises performing one or more of relational database functions, binary classification, linear regression, query execution, and aggregation to generate an output.

15. A device comprising:
   a processor; and
   a memory device coupled to the processor and having a program stored thereon for execution by the processor to perform operations comprising:
receiving data from multiple devices at an edge server via local wireless connections to the multiple devices;
   transforming the data received from the multiple devices;
   storing the transformed data in an edge server relational database having a database engine;
   uploading the transformed data to a remote server;
   receiving from the remote server, a trained machine learning model trained on the transformed data;
   receiving new data from the multiple devices;
   executing, on the edge server, the trained machine learning model on the new data to perform scoring;
   determining an action based on the scoring performed by the trained machine learning model;
   generating a control signal, to control one or more devices, based on the determined action; and
   transmitting the control signal to one or more of the devices for causing the action to be performed by the one or more devices based on the control signal.

16. The device of claim 15 wherein the data received from each of the wireless devices is received periodically from the multiple wireless devices and wherein transforming the data received from each of the multiple wireless devices includes buffering and transforming data received during a specified window of time.

* * * * *